(No Model.)
W. H. WALSH.
RAILWAY SIGNALING APPARATUS.
No. 535,565. Patented Mar. 12, 1895.
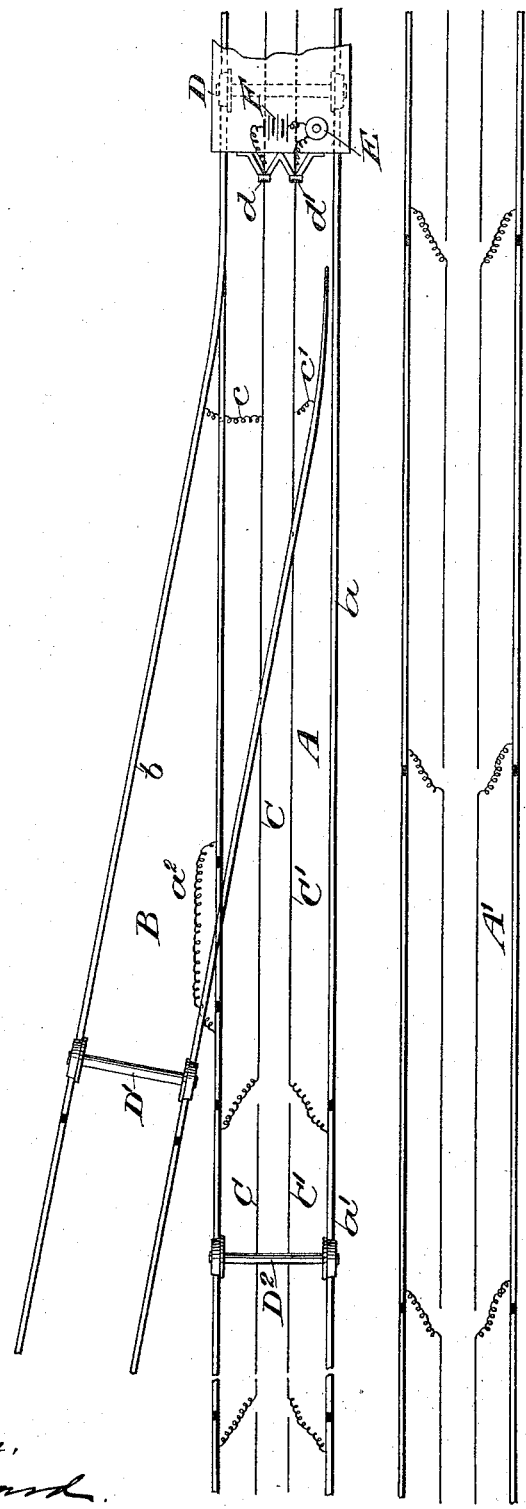
Witnesses:—
George Barry,
R. B. Linnard.
Inventor
William H. Walsh
by attorneys
Brown & Seward

UNITED STATES PATENT OFFICE.

WILLIAM H. WALSH, OF ALBANY, NEW YORK.

RAILWAY SIGNALING APPARATUS.

SPECIFICATION forming part of Letters Patent No. 535,565, dated March 12, 1895.

Application filed January 24, 1895. Serial No. 536,009. (No model.)

*To all whom it may concern:*

Be it known that I, WILLIAM H. WALSH, of Albany, in the county of Albany and State of New York, have invented a new and useful Improvement in Railway Signaling Apparatus, of which the following is a specification.

My invention relates to an improvement in railway signaling apparatus, in which provision is made for warning a train approaching a shunt track of any obstacle on the shunt track which will be liable to interfere with the passage of the train along the main track and also of the opening of the main track to close the shunt track and also of any obstacle within a section's distance on the main track beyond the shunt track.

The accompanying drawing represents a portion of a double track railway, the two tracks being denoted respectively by A and A'; the trains on the track A being assumed as moving in the direction from right to left, as the sheet is held, and those on the track A' from left to right. A shunt track B is shown as branching from the main track A. The main track is divided into sections, the rails of which are insulated from one another; one of the sections on the track A being denoted by $a$ and another adjacent to it by $a'$. The rails of the shunt track B are also insulated at a distance from the track A sufficient to carry a train on the shunt track out of the way of a train on the main track. The insulated section of the shunt track B adjacent to the main track is denoted by $b$. Where the shunt track rail crosses the main track rail, it is insulated from the main track rail, in the present instance by insulating the main track rail from adjacent portions of the rail at short distances upon opposite sides of the shunt track rail and connecting the main track rail upon opposite sides of said insulations by an electric connection $a^2$.

Along the track A there extends electric conductors C, C' each connected with one of the rails of an adjacent section of the main track, but disconnected from the said electrical conductors of said adjacent section. One of the rails of the shunt track B is connected by an electric conductor $c$ with the conductor C along the main track and the opposite rail is connected by a conductor $c'$ with the other conductor C' along the main track.

At D, I have shown—conventionally—a portion of a locomotive provided with brushes $d$, $d'$ in an electric circuit with a signal E, in the present instance a bell and a battery F. I have also shown a portion of a car truck D' bridging the rails of the shunt track section $b$, and a portion of a car truck $D^2$ bridging the rails of a section $a'$ of the main track.

Suppose a train be passing along the track A and coming on the section $a$. If there is a train or a portion of a train on the shunt section $b$, the bell E will be sounded by the completion of the electric circuit through the rails of the shunt section $b$, the truck D', the connections $c$, $c'$, the conductors C, C', the brushes $d$, $d'$ and the wires leading from said brushes through the battery F and bell. Again, if the train in advance of the locomotive D has not passed off the section $a'$, the engineer will be warned of the fact by the sounding of the bell E, the circuit being completed through the rails of the section $a'$, the truck $D^2$, the conductors C, C', the brushes $d$, $d'$ and the wires leading therefrom, through the battery F and bell. Again, if the switch be closed and main track open, the engineer will be warned of that fact by the electric circuit complete through the rails of the section $a$, the rails of the shunt section $b$ now in contact with the rails of the section $a$, the truck of the locomotive D bridging said rails, the connections $c$, $c'$, the conductors C, C', the brushes $d$, $d'$ and the wires leading therefrom through the battery and bell. If the way be clear, no signal will be sounded because of the break in the several circuits referred to.

What I claim is—

1. In combination, a main track, a shunt track branching therefrom, the main track at the point where the shunt track branches therefrom being insulated from adjacent portions of the main track and the shunt track having its portion adjacent to the main track insulated from an adjacent portion, the shunt track being at the same time insulated from the main track at the point where it crosses it, conductors extending along the insulated main track section and electrically connected with an adjacent section and connections between the rails of the insulated shunt track section and said conductors, substantially as set forth.

2. In combination, a main track separated into consecutive insulated sections, a shunt track branching from one of said sections and insulated from said section at the point where one of its rails crosses it, the said shunt track having its section ajacent to the main track insulated from an adjacent section, conductors extending along the main track and electrically connected with the rails of an adjacent section, connections between the rails of the shunt track and said conductors and a carriage adapted to move along the track and provided with brushes in position to engage the said conductors and in circuit with a battery and signal, substantially as set forth.

WILLIAM H. WALSH.

Witnesses:
 IRENE B. DECKER,
 R. B. SEWARD.